United States Patent
Norris

(12) 
(10) Patent No.: US 6,369,350 B1
(45) Date of Patent: Apr. 9, 2002

(54) PLASMA-ARC TORCH SYSTEM WITH PILOT RE-ATTACH CIRCUIT AND METHOD

(75) Inventor: Stephen W. Norris, New London, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 09/870,272

(22) Filed: May 30, 2001

(51) Int. Cl.[7] ............................................... B23K 10/00
(52) U.S. Cl. ............................ 219/121.57; 219/121.54; 219/130.4; 219/130.32
(58) Field of Search ..................... 219/121.57, 121.54, 219/121.5, 74, 75, 130.32, 130.4

(56) References Cited

U.S. PATENT DOCUMENTS

| | | | |
|---|---|---|---|
| 2,960,594 A | 11/1960 | Thorpe | |
| 3,813,510 A | 5/1974 | Hatch | |
| 3,988,566 A | 10/1976 | Vogts et al. | |
| 4,122,327 A | 10/1978 | Vogts et al. | |
| 4,280,042 A | 7/1981 | Berger et al. | |
| 4,766,286 A | 8/1988 | Iceland | |
| 4,901,720 A | 2/1990 | Bertrand | |
| 4,929,811 A | * 5/1990 | Blankenship | 219/121.54 |
| 4,996,407 A | 2/1991 | Traxler | |
| 5,170,030 A | 12/1992 | Solley et al. | |
| 5,235,162 A | 8/1993 | Nourbakhsh | |
| 5,296,665 A | 3/1994 | Peterson et al. | |
| 5,506,384 A | 4/1996 | Yamaguchi | |
| 5,530,220 A | 6/1996 | Tatham | |
| 5,620,617 A | 4/1997 | Borowy et al. | |
| 5,630,952 A | 5/1997 | Karino et al. | |
| 5,660,745 A | 8/1997 | Naor | |
| 5,796,067 A | 8/1998 | Enyedy et al. | |
| 5,828,030 A | 10/1998 | Naor | |
| 5,831,237 A | 11/1998 | Daniel | |
| 5,844,197 A | 12/1998 | Daniel | |
| 5,847,354 A | 12/1998 | Daniel | |
| 5,864,110 A | 1/1999 | Moriguchi et al. | |
| 5,866,869 A | 2/1999 | Schneider et al. | |
| 5,866,872 A | * 2/1999 | Lu et al. | 219/121.56 |
| 5,900,169 A | 5/1999 | Borowy et al. | |
| 5,961,855 A | 10/1999 | Hewett et al. | |
| 5,990,443 A | 11/1999 | Tatham et al. | |
| 6,054,670 A | 4/2000 | Naor | |
| 6,133,543 A | 10/2000 | Borowy et al. | |

* cited by examiner

Primary Examiner—Mark Paschall
(74) Attorney, Agent, or Firm—Senniger, Powers, Leavitt & Roedel

(57) ABSTRACT

A plasm-arc torch system, a circuit, and a method for controlling a pilot arc. A rate of change sensor, such as a dv/dt sensor, monitors the output of an error amplifier to determine whether to close a switch to re-attach a pilot arc before a transferred arc becomes extinguished. The switch selectively connects a tip into a circuit path with an electrode and a power supply to allow the pilot arc to form between the tip and the electrode. The error amplifier preferably provides an error signal for use by a pulse-width modulator for providing a current regulated power supply capability. The power supply preferably regulates the output current to a first level when a pilot arc is present, and to a second mode when a transferred arc is present. The pilot arc may also be re-attached between the tip and the electrode by use of a pilot regulator that attempts to maintain the current flowing through the tip at an intermediate level between the first level and the second level. The pilot regulator is responsive to the total current flowing through the electrode but can only control that portion of the total current that flows through the tip.

19 Claims, 6 Drawing Sheets

FIG. 1

PLASMA-ARC TORCH SYSTEM WITH PILOT RE-ATTACH CIRCUIT AND METHOD

BACKGROUND OF THE INVENTION

The invention relates generally to plasma-arc torch systems and power supplies. In particular, the invention relates to a circuit and method for controlling the pilot arc in a plasma-arc torch.

Plasma-arc torches, also known as electric arc torches, are commonly used for cutting, welding, and spray bonding workpieces. Such torches typically operate by directing a plasma consisting of ionized gas particles toward a workpiece. An example of a conventional gas plasma-arc torch is disclosed in U.S. Pat. No. 3,813,510, the entire disclosure of which is incorporated herein by reference.

In general, a pressurized gas to be ionized is supplied to the front end of the torch and flows past an electrode before exiting through an orifice in a torch tip. The electrode has a relatively negative potential and operates as a cathode. The torch tip, which is adjacent the electrode at the front end of the torch, constitutes a relatively positive potential anode. When a sufficiently high voltage is applied to the electrode, an arc is established across the gap between the electrode and the torch tip, thereby heating the gas and causing it to ionize. The ionized gas in the gap is blown out of the torch and appears as a flame extending externally from the tip. The arc so established is commonly referred to as a pilot arc. A typical pilot arc circuit may provide 5–50 amps, at 100–200 volts across the electrode to tip gap.

In order to use a plasma-arc torch with a workpiece, a main or cutting arc must normally be established between the electrode and the workpiece. As the torch head or front end is brought toward the workpiece, the arc transfers between the electrode and the workpiece because the impedance of the workpiece to negative is typically lower than the impedance of the torch tip to negative. During this "transferred arc" operation, the workpiece serves as the anode.

Once the arc transfer is sensed, it is generally preferred to cease current flow between the electrode and the tip. One method of terminating current flow between the electrode and the tip is to open circuit the pilot arc current path. This may be accomplished by sensing the presence of current flowing in the workpiece and open circuiting a switch between the tip and ground (positive return). Commonly owned U.S. Pat. Nos. 5,170, 030, and 5,530,220, the entire disclosures of which are incorporated herein by reference, describe the arc transfer process in greater detail.

After arc transfer occurs, the output current is typically increased to a higher, cutting level. The power supply preferably is current controlled so that the cutting current is maintained at or near a constant current level. If, however, the transferred arc is stretched beyond the capacity of the power supply it can extinguish. The arc may stretch, for example, when cutting a discontinuous workpiece (e.g., a metal grate), when cutting near the end of a workpiece, or when the torch is moved away from the workpiece. Once the arc has been extinguished, the torch starting process must typically be repeated. As can be appreciated, restarting the torch is relatively inefficient. Therefore, it is generally preferable to cause the pilot arc to re-attach before the transferred arc extinguishes.

U.S. Pat. No. 5,620,617 discloses an arc control circuit for a plasma-arc torch. A comparator compares the output voltage of the power supply to a maximum voltage. When the output voltage exceeds the maximum voltage, the comparator sets a logic device. The logic devices generates a signal to close a switch and reconnect the nozzle to the power supply, thereby switching the arc from the workpiece to the nozzle.

U.S. Pat. No. 5,844,197 discloses an arc retract circuit for use in a plasma-arc torch. The system disclosed therein involves creating a first signal representing the actual current applied by the power supply to the power circuit driving the plasma torch, creating a second signal representative of a current level below the set current level for the cutting operation, and closing a power switch in the pilot arc circuit when the first signal is essentially equal to the second signal.

The arc control/retract circuits disclosed in these patents require a comparison to a predefined reference (either voltage or current) in order to properly operate. Accordingly, such circuits are inherently limited by the reference chosen and require additional circuitry to establish the predefined reference.

For these reasons, a plasma-arc torch system having an improved pilot re-attach circuit and method is desired. Such a system and method requires the creation of no additional current or voltage reference signal in order to accurately sense when to cause the pilot arc to re-attach. Further, such a system and method preferably uses an existing signal to determine when to re-attach the pilot arc. Finally, such a system and method preferably provides a reliable and repeatable method of re-attaching the pilot arc prior to the extinguishment of the transferred arc.

SUMMARY OF THE INVENTION

The invention meets the above needs and overcomes the deficiencies of the prior art by providing an improved circuit and method for accurately determining whether and when to re-attach a pilot arc when a transferred arc may no longer be sustained. Advantageously, this is accomplished by monitoring the output of an already existing error amplifier output associated with a standard regulated power supply. Moreover, the improvement can be accomplished without the need for creating additional reference signals for comparison purposes that are not already present in a regulated power supply.

Briefly described, a plasma-arc torch system for use in connection with a workpiece embodying aspects of the invention includes a power source providing a power output current. An electrode is positioned in a circuit path with the power source. The output current flows through the electrode. A tip is adjacent the electrode. A current reference circuit provides a current reference signal that has a parameter indicative of a desired output current. A current regulator circuit provides an error signal that has a parameter indicative of a difference between the output current and the desired output current. A rate of change sensor receives the error signal. The rate of change sensor detects a rate of change in the error signal and selectively provides a switch control signal that has a parameter indicative of the rate of change in the error signal. A switch circuit is responsive to the switch control signal. The switch circuit selectively electrically connects the tip into the circuit path.

Another embodiment of a plasma-arc torch system for use with workpiece in accordance with the invention includes a power source providing an output current. An electrode is positioned in a circuit path with the power source. The electrode has the output current flowing therethrough. A tip is adjacent the electrode. A current reference circuit provides a current reference signal having a parameter indicative of the output current. An error amplifier compares the current reference signal to the sensed current signal and generates an error signal having a parameter indicative of a difference between the current reference signal and the sensed current signal. A rate of change sensor is electrically connected to the error amplifier. The rate of change sensor receives the error signal and selectively provides a switch control signal in response to a rate of change in the error signal. A switch circuit is responsive to the switch control signal. The switch circuit selectively electrically connects the tip into the circuit path with the power source and the electrode.

Another embodiment of the invention includes a pilot re-attach circuit for use in a plasma-arc torch system. The torch system includes a power source that provides an output current. An electrode is positioned in a circuit path with the power source and has the output current flowing therethrough. A tip is adjacent the electrode. An error amplifier generates an error signal in response to a difference between a signal representative of a sensed operating current and a signal representative of a desired operating current. The pilot re-attach circuit includes a rate of change sensor that receives the error signal and that is responsive to a time rate of change of the error signal. The rate of change sensor provides a switch control signal having a first state when the time rate of change of the error signal is less than a threshold. The rate of change signal has a second state when the time rate of change of the error signal exceeds the threshold. A pilot switch is responsive to the switch control signal. The pilot switch is operable to electrically connect the tip into the circuit path with the power source and the electrode when the switch control signal is in the second state.

In still another embodiment, the invention includes a plasma-arc torch system for use in connection with a workpiece. A power source means provides an output current. An electrode is positioned in a circuit path with the power source means. The electrode receives the output current. A tip is adjacent the electrode. A current reference means provide a current reference signal having a parameter indicative of a desired value of the output current. A current sensing means provides an actual output current signal having a parameter indicative of the output current. A comparing means compares the current reference signal to the actual output current signal. The comparing means generates an error signal having a parameter indicative of the difference between the current reference signal and the actual output current signal. A detector means is electrically connected to the error amplifier. The detector means receives the error signal and selectively provides a switch control signal in response to a rate of change in the error signal. A switching means is responsive to the switch control signal for selectively electrically connecting the tip into the circuit path with the power source means and the electrode.

Another embodiment of the invention includes a method of operating a plasma-arc torch system that includes a power supply that supplies an output current, and a pilot switch that establishes a pilot arc mode of operation. An output current signal having a parameter representative of the output current is compared to a reference signal having a parameter representative of a difference between the output current and the desired output current. An error signal is generated having a parameter representative of a difference between the output current and the desired output current. A rate of change of the error signal is monitored. The pilot switch is operated when the rate of change of the error signal exceeds a rate of change threshold such that the pilot arc mode of operation is established.

In still another embodiment, the invention includes a method of reestablishing a pilot arc in a plasma-arc torch system before a transferred arc is extinguished. The plasma-arc torch system includes an electrical power source providing an output current. An electrode receives the output current. A tip is adjacent the electrode. A pilot switch selectively connects the tip in a circuit path with the electrode and the power source such that when the pilot switch is closed, a pilot arc is selectively established between the electrode and the tip. The method includes monitoring an output current signal having a parameter representative of the output current provided by the electrical power source. A current reference signal is generated that has a parameter representative of a desired output current. The output current signal is compared to the current reference signal. An error signal is generated that is representative of a difference between the output current and the desired output current. A rate of change in the error signal is detected. A switch control signal is generated in response to the detected rate of change in the error signal. The switch control signal is representative of whether the detected rate of change in the error signal is greater than or less than a rate of change threshold. A pilot switch is operated in response to the rate of change signal such that when the rate of change is greater than the rate of change threshold, the pilot switch closes and connects the tip into the circuit path with the electrode and the power source.

A further embodiment of the invention includes a plasma-arc torch system for use in connection with a workpiece. A power source has a main regulator selectively providing an output current. An electrode is positioned in a circuit path with the power source and receives the output current. A tip is selectively connected into the circuit path with the power source and the electrode. An output current sensor provides an output current signal having a parameter indicative of the output current. A work current sensor provides a work current signal having a parameter indicative of the presence of work current flowing through the workpiece. The main regulator is responsive to the work current signal and the output current signal for regulating the output current to a first level when the work current signal indicates the presence of work current, and regulating the output current to a second level when the work current signal indicates the presence of no work current. A pilot regulator is responsive to the output current signal. The pilot regulator connects the tip into the circuit path with the power source and the electrode when the output current is less than a pilot regulator threshold. The pilot regulator disconnects the tip from the circuit path with the power source and the electrode when the output current is greater than the pilot regulator threshold.

In yet a further embodiment, the invention includes a method of operating a plasma arc torch system. The plasma-arc torch system includes a power supply providing an output current. An electrode receives the output current. A tip is adjacent the electrode. A switch selectively connects the tip into a circuit path with the power supply and the electrode. The torch system has a pilot mode of operation in which the power supply regulates the output current to a pilot current level. The torch system has a transferred arc mode of operation in which the power supply regulates the output to a cutting current level. The cutting current level is greater than the pilot current level. The method includes sensing the output current. The sensed output current is compared to an intermediate current level between the pilot current level and the cutting current level. The switch is configured as a pilot regulator for regulating a portion of the output current flowing through the tip to an intermediate level between the pilot current level and the cutting current level. The pilot regulator receives an output current signal indicative of the output current and connects the tip into the circuit path with the power supply and the electrode when the output current signal indicates that the output current is less than the intermediate current threshold. The pilot regulator disconnects the tip from the circuit path with the power supply and the electrode when the output current signal indicates that the output current is greater than the pilot regulator threshold.

Alternatively, the invention may comprise various other methods and systems.

Other objects and features will be in part apparent and in part pointed out hereinafter.

BRIEF DESCRIPTION OF THE DRAWINGS

FIG. 1 is block diagram of aspects of a plasma-arc torch system suitable for use with a pilot re-attach circuit and method according to the present invention.

Corresponding reference characters indicate corresponding parts throughout the drawings.

DETAILED DESCRIPTION OF PREFERRED EMBODIMENTS

Figure 1:
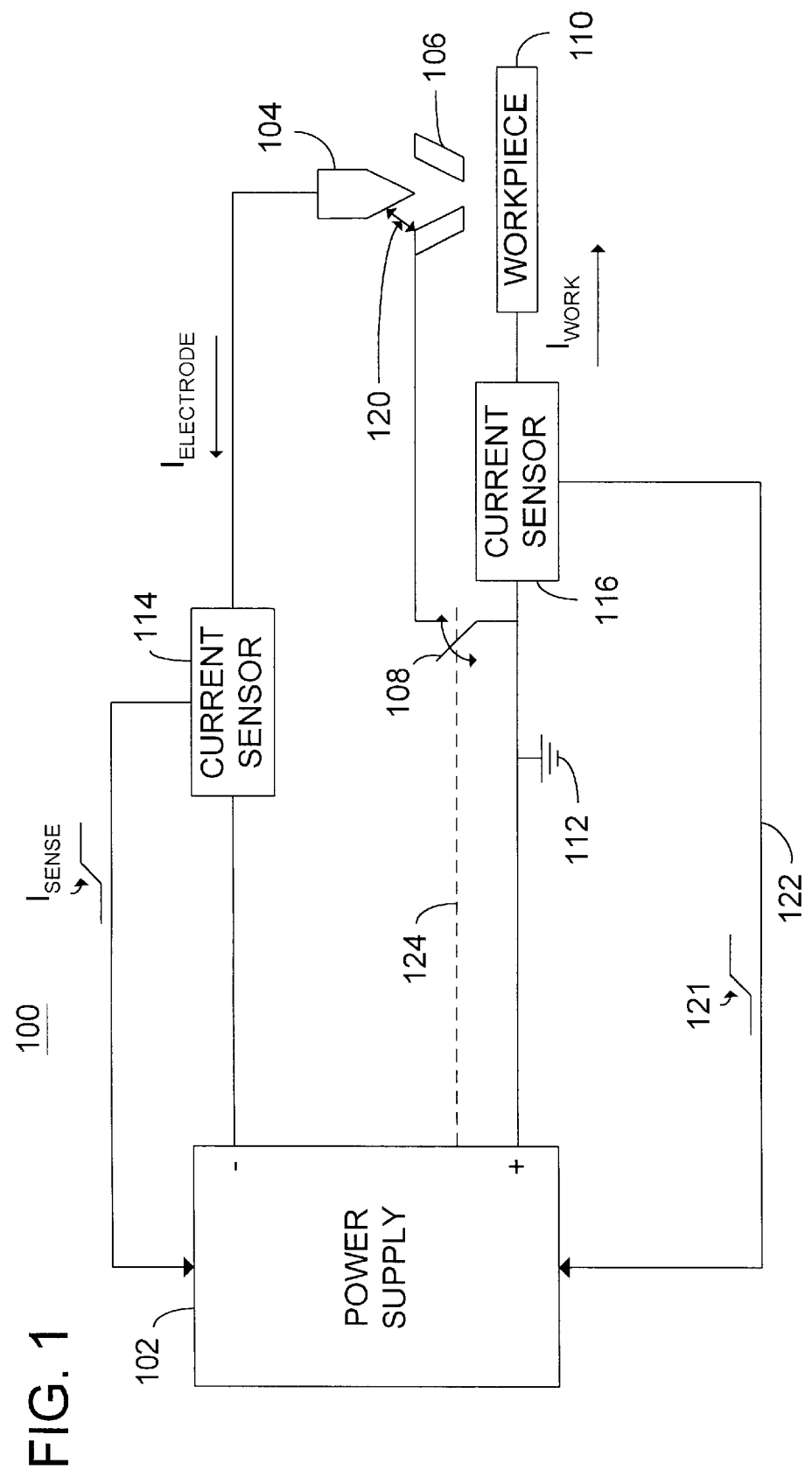
Figure 2:
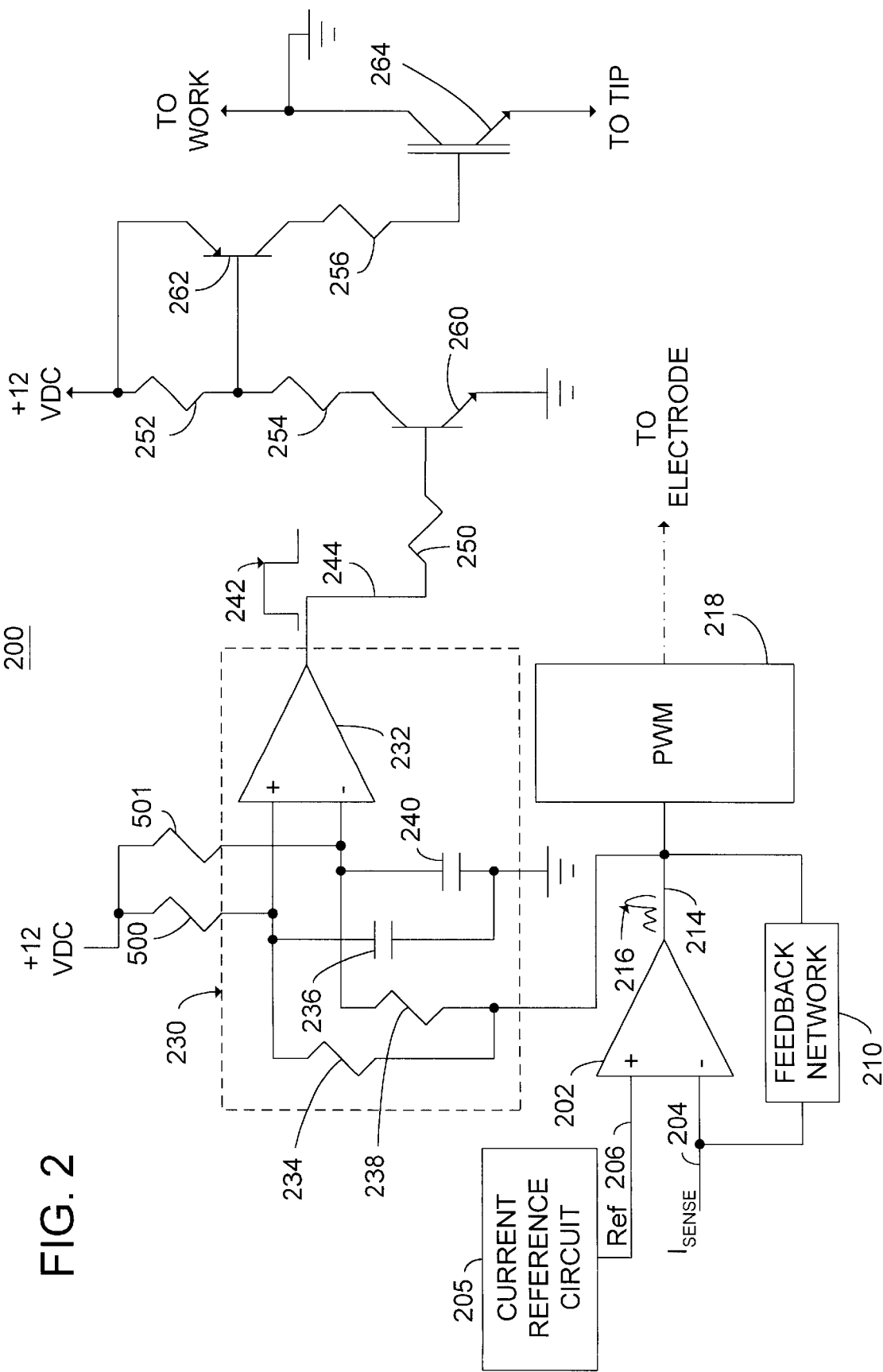
FIG. 2 is a schematic of a pilot re-attach circuit suitable for use with the present invention.

Referring now to the drawings, FIG. 1 is a block diagram that illustrates several basic components of a plasma-arc torch system 100 that is suitable for use with a pilot re-attach circuit and method according to the present invention. Such a system 100 includes a power supply 102, an electrode 104, a tip 106 (also referred to as a nozzle), and a pilot switch 108. The electrode 104 is electrically connected in a circuit path to the negative side of the power supply 102. The tip 106 is connected to the pilot switch 108 which is selectively operable to connect tip 106 to a positive ground 112, which is connected to the positive side of power supply 102. The pilot switch 108 preferably provides a low impedance path between tip 106 and ground 112. A workpiece 110 is also connected to ground 112. It should be understood that pilot switch 108, although illustrated external to power supply 102, is preferably internal to the power supply housing.

A first current sensor 114 is connected in the circuit path at a position allowing it to sense an electrode current $I_{electrode}$ flowing through electrode 104. There are a variety of current detecting/sensing means available including high power, low impedance resistors, current sensing toroids, hall sensors, and the like. The electrode current $I^{electrode}$ represents the total current draw of the torch system. A second current sensor 116 is associated with workpiece 110. The second current sensor 116 is also referred to as a work current sensor 116 and may also comprise a high power, low impedance resistor, a current sensing toroid, a hall sensor or any other suitable current sensing/detecting device. Work current sensor 116 detects the current $I_{work}$ flowing through workpiece 110, and is preferably associated with the lead connecting workpiece 110 to the positive side of power supply 102.

The general operation of torch system 100, from initial power up through the initiation of a cutting operation will now be discussed. Upon power up and satisfactory completion of various initial safety interlock checks, pilot switch 108 should be initially closed (conducting) because no current is sensed in work current sensor 116. As such, tip 106 is connected in the circuit path between ground 112 and electrode 104. The torch operator initially establishes a pilot arc between electrode 104 and tip 106 by one of several ways which are generally known in the art. Such starting methods include, for example, contact starting or creating a spark by way of a high frequency, high voltage starting circuit. Thus, as ionized gas flows past electrode 104 and through tip 106, the current flowing through electrode 104 jumps the gap 120 between electrode 104 and tip 106 to form a pilot arc (not shown). As tip 104 is moved closer to workpiece 110, some of the total current begins to flow in workpiece 1 10 as the arc transfers to workpiece 110. Work current sensor 116 senses this work current flow and sends a work current signal 121 to power supply 102 via line 122. When power supply 102 receives the work current signal 121 on line 122, it opens pilot switch 108 (shown by dashed line 124) thereby disconnecting tip 106 from ground 112. With pilot switch 108 open (non-conducting), the impedance between electrode 104 and workpiece 110 is much lower than the impedance between electrode 104 and the now open-circuited tip 106, therefore, the entire arc tends to flow between electrode 104 and workpiece 110. This is referred to as a transferred arc mode of operation (transferred arc not shown) and the current flowing in this mode may be referred to as a cutting current. In this transferred arc mode, substantially all of the electrode current $I_{electrode}$ flows between electrode 104 and workpiece 110 as a cutting current for cutting workpiece 110. Also, when tip 106 is disconnected, the pilot mode is terminated and the output demand may increase from the current level used during the pilot mode (e.g., around 15 to 20 A) to the cutting current level (e.g., 25 to 80 A or more). The actual cutting current level is preferably user selectable via an adjustment knob (not shown), but may also be fixed at one or a plurality of settings.

As discussed above in the Background of the Invention, when cutting a discontinuous workpiece or the transferred arc otherwise stretches (i.e., because the torch nears the end of the workpiece or the torch is being pulled away from the workpiece), the power supply, such as power supply 102, must provide a greater voltage potential between electrode 104 and workpiece 110 to maintain the arc at the desired output current level. After the power supply can no supply the necessary voltage to maintain the output current, the transferred arc extinguishes.

FIG. 2 is a schematic of a preferred pilot re-attach circuit 200 for re-establishing the pilot arc between electrode 104 and tip 106 before the transferred arc extinguishes. As illustrated in FIG. 2, the pilot re-attach circuit 200 preferably includes an error amplifier 202, which is a standard part of a regulated power supply, configured to receive and compare signals representative of the actual output current (shown in FIGS. 1 and 2 as $I_{sense}$) and the desired operating current (shown in FIG. 2 as Ref.). For example, $I_{sense}$ is a signal that may be derived from current sensor 114 (FIG. 1) and includes a parameter indicative of the current flowing through electrode 104 (e.g., $I_{electrode}$). Thus, it should be understood that the signals representative of the actual output current ($I_{sense}$) and the desired operating current (Ref.) reflect the actual and desired current values, but need not be such values per se.

The error amplifier 202 is preferably configured as a high gain device (e.g., greater than 100). In particular, a feedback control network 210 is preferably connected between an output 214 of error amplifier 202 and its inverting input 204. Thus, error amplifier output 214 provides a high gain voltage signal 216 (also referred to as an error signal or a current control error signal) indicative of the difference between the desired operating current (operating current set point, Ref.) and the sensed output current ($I_{sense}$)

The output 214 of error amplifier 202 is connected to a pulse width modulator 218 (PWM 218), the operation of which is described below, as part of the power supply regulation loop. Error amplifier output 214 is also connected to a dv/dt sensor 230 that is constructed and configured to respond to changes over time in the high gain voltage signal 216 on output 214. In the embodiment illustrated in FIG. 2, the dv/dt sensor 230 preferably includes a comparator 232, and two R-C input networks. The first R-C network comprises a resistor 234 and a capacitor 236. One side of the resistor 234 is connected to error amplifier output 214. The other side of resistor 234 is connected to the non-inverting input of the comparator 232. Similarly, one side of the capacitor 236 is connected to the non-inverting input of comparator 232, while the other side is connected to ground. The second R-C network comprises a resistor 238 and a capacitor 240. One side of the resistor 238 is connected to error amplifier output 214. The other side of resistor 238 is connected to the inverting input of the comparator 232. One side of the capacitor 240 is connected to the inverting input of comparator 232, while the other side is connected to ground. The time constant of the first R-C network (resistor 234 and capacitor 236) is preferably shorter than the time constant of the second R-C network (resistor 238 and capacitor 240) so that comparator 232 can detect sharp rises in voltage signal 216.

The dv/dt sensor 230 provides a switch control signal 242 on output line 244 to a switch control network that includes resistors 250, 252, 254, 256, npn transistor 260, pnp transistor 262, and pilot switch 264. More particularly, the output of comparator 232 is coupled to the base of transistor 260 via line 244 and the series resistor 250. The emitter of transistor 260 is connected to ground. The collector of transistor 260 is connected to a positive bias voltage (e.g., 12 VDC) through two series resistors 252, 254. The emitter of transistor 262 is connected to the 12 VDC bias voltage. The base of transistor 262 is connected to the junction of series resistors 252, 254. The collector of transistor 262 is connected to the gate of pilot switch 264 through resistor 256. As illustrated in FIG. 2, pilot switch 264 preferably comprises an IGBT because of its superior power switching characteristics and capabilities. It is to be understood, however, that other power switching devices such as thyristors, power transistors, relays, and the like may be used with the present invention.

The collector of pilot switch 264 is connected to workpiece 110 and ground, and the emitter is connected to tip 106. Thus, when pilot switch 264 is closed (conducting), tip 106 is connected to ground in the circuit path, thus allowing current to flow between electrode 104 and tip 106.

Referring now to both FIGS. 1 and 2, the torch system 100 preferably operates in a constant current/current-controlled mode. Hence, when the torch operates in the pilot mode, output current ($I_{electrode}$) is preferably maintained at a relatively low pilot level (e.g., 15 A) by varying the pulse widths of the output voltage of PWM 218. Similarly, when torch system 100 operates in the transferred arc mode, output current ($I_{electrode}$) is preferably maintained at a relatively higher cutting level (e.g., 25 A or more) by varying the pulse widths of the output voltage. The desired cutting current level is preferably manually selectable via a switch 205 (also referred to as a current reference circuit) that allows for several discrete current settings or continuously variable current settings within upper and lower limits. It should be appreciated, however, that the present invention should not be limited as such and could work as well with a system having a single cutting current set limit. In the pilot mode, a fixed or preset current level may be used.

Current control is a preferred method of controlling the power in plasma-arc torches. Current control is typically achieved by controlling the pulse widths of the voltage applied to the output filter inductor (not shown). Stated differently, power supply 102 uses pulse width modulation of the applied voltage to attempt to provide a constant current output. The pulse width applied is a function of error signal 216 from error amplifier 202. As such, error amplifier 202 forms part of a current regulator circuit, along with PWM 218.

Error amplifier 202 receives two inputs. The first input is a signal ($I_{sense}$) that is representative of the actual output current ($I_{electrode}$). The second input is a reference signal that reflects the desired current level (e.g., 15 A in the pilot mode, or 25 A or more in the transferred arc mode). When both inputs to error amplifier 202 are substantially the same, current control is being achieved, and the error signal 216 from error amplifier 202 changes a small amount, if at all. PWM 218 is responsive to this error signal 216 and adjusts the output pulses accordingly. In other words, small changes in error signal 216 result in small changes in the output pulses. If, on the other hand, there is a substantial difference between the $I_{sense}$ signal and the reference signal, error signal 216 will be larger.

As explained already herein, when the torch system 100 is used in the transferred arc mode to cut a discontinuous workpiece or the torch is moved away from the workpiece, the transferred arc length tends to stretch. This stretching of the transferred arc increases the voltage potential required to maintain the arc, and consequently, places increased pulse width demands on power supply 102 in general, and on PWM 218 in particular. Error signal 216 reflects this change. As the arc length increases, at some point PWM 218 supplies maximum pulse widths in an attempt to maintain the current at the set point level. When PWM can no longer maintain the current level at the desired level, error signal 216 rapidly rises. It is this rapid rise in error signal 216 that dv/dt sensor 230 advantageously utilizes to determine that the transferred arc may soon extinguish.

Error signal 216 is fed to the inverting and non-inverting inputs of comparator 232 via two R-C input networks. The first network comprises resistor 234 and capacitor 236; the second network comprises resistor 238 and capacitor 240. In the preferred embodiment illustrated in FIG. 2, the relative time constants of the first and second R-C input networks are selected such that comparator 232 provides a high output via switch control signal 242 only when a sharp rate of change occurs in the output of error amplifier 202—when error signal 216 rises sharply. Other, more moderate changes in the output of error amplifier 202 preferably do not trigger a high output from comparator 232. Thus, by configuring the first R-C network to have a shorter time constant than the second R-C network, comparator 232 can be tuned to detect changes in the slope of error signal 216. Resistors 500 and 501 normally bias the inputs of comparator 232 so that its output is low. For example, if resistor 234 is 100 kΩ, capacitor 236 is 220 pf, resistor 238 is 100 kΩ, and capacitor 240 is 0.1 µf, the time constant of the first R-C network is 22 µsec, and the time constant of the second R-C network is 10 msec. It is to be understood that the foregoing values are provided for exemplary purposes only and they are not to be read in anyway as limiting any aspect of the present invention. It is also to be understood that other timing relationships are possible and contemplated within the scope of the present invention. It is further to be understood that other rate of change detectors may be used. Such detectors may include, for example, an operation amplifier, or a digital control system.

When dv/dt sensor 230 senses a sharp rise in error signal 216, it asserts switch control signal 242 on line 244. The switch control network, including transistors 260, 262, and pilot switch 264, receives and is responsive to switch control signal 242. Thus, when dv/dt sensor 230 asserts switch control signal 242, pilot switch 264 is gated on (conducts) so that tip 106 is connected into the circuit path with electrode 104. Recalling that at this point the transferred arc length has been stretched, the relative impedance between tip 106 and electrode 104 is typically less than the impedance between workpiece 110 and electrode 104. Accordingly, when pilot switch 264 conducts, a pilot arc is re-attached between electrode 104 and tip 106.

The operation of the switching network and the gate control of pilot switch 264 will now be briefly described. When dv/dt sensor 230 detects a sharp rise in error signal 216, switch control signal 242 is applied to the base of transistor 260 via resistor 250. Because the collector of transistor 260 is connected to a positive voltage bias (e.g., 12 VDC), it acts as a switch and conducts when switch control signal 242 is applied. When transistor 260 conducts, a voltage drop is induced across resistor 252, thus causing transistor 262 to conduct. When transistor 262 conducts, a voltage is applied to the gate of pilot switch 264 (an IGBT) causing that switch to close (conduct), thereby connecting tip 106 into the circuit path.

As can now be appreciated, the present invention provides several advantages over prior art arc control systems and circuits. For example, the dv/dt sensor does not require the use of artificial voltage or current comparisons to determine when to close pilot switch 264. Rather, by using dv/dt sensor 230 to monitor the error signal that is normally used to drive PWM 218, the dv/dt sensor of the present invention requires no separate, artificial reference standards. Further, by sensing sharp changes in error signal 216, the dv/dt sensor accurately and reliably detects when a transferred arc has been stretched to the limit of being extinguished.

Figure 3:
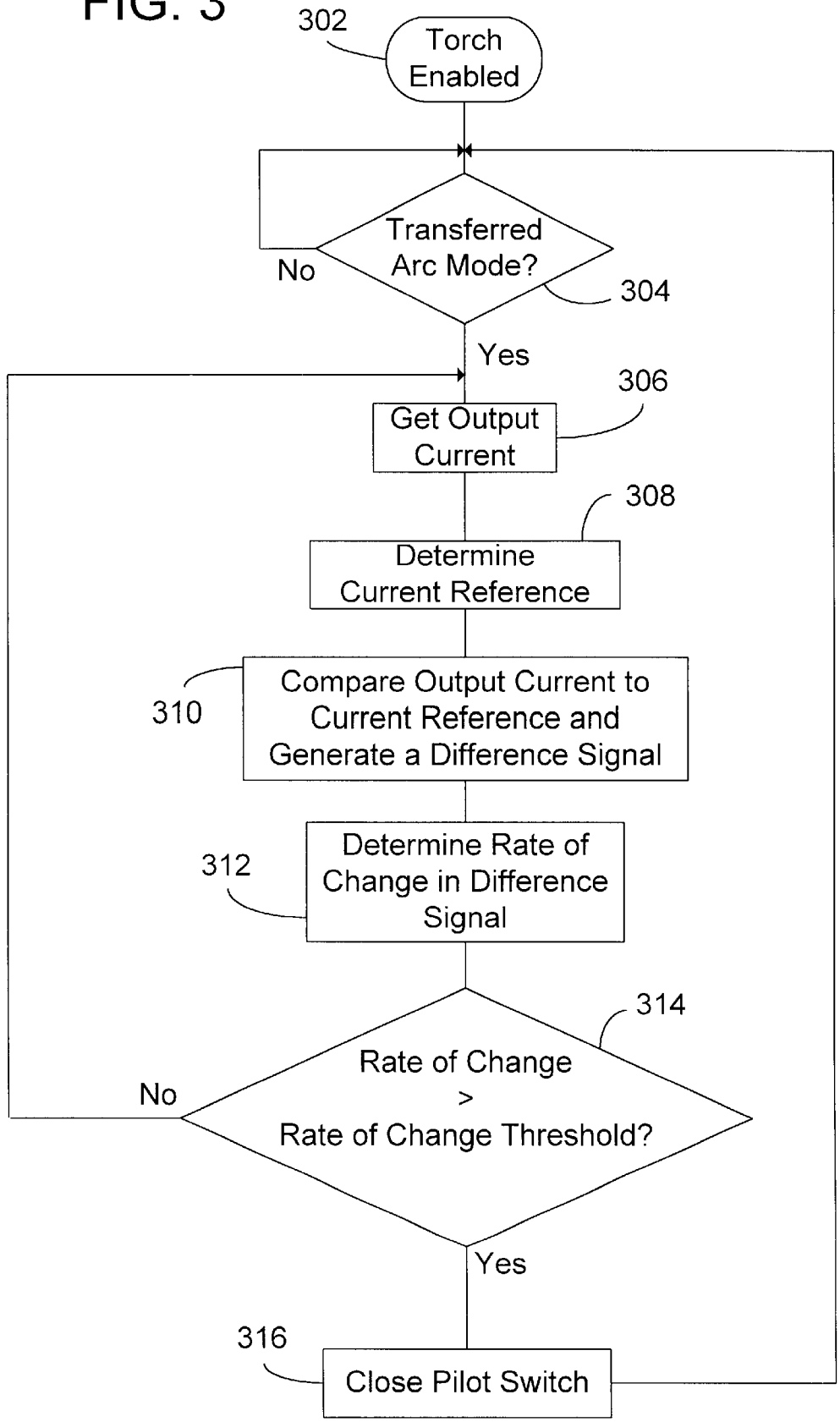
FIG. 3 is a flow diagram that illustrates a method operating an arc in a plasma-arc torch system by monitoring the rate of change of a difference signal.

FIG. 3 is a flow diagram that describes a process by which arc transfer and re-attach can be achieved. In particular, FIG. 3 illustrates a method of operating an arc in a plasma-arc torch system that includes monitoring the rate of change in a difference signal. At step 302, the torch is enabled (e.g., all safety interlocks have been satisfied and some form of arc, pilot or transferred, has been struck). If it is determined at step 304 that the torch system is operating in the pilot mode, the pilot switch is already closed, so the process waits. If the torch system is operating in the transferred arc mode, the actual output current is determined at step 306. It should be understood that rather than monitoring current per se, a current sensing device may be used that supplies a signal that is representative of the actual output current. At step 308, the proper reference current is determined. Because the present method is advantageously designed to work with any output current setting, the actual setting should be determined. Again, this reference need not be a current per se, but may be a signal that is representative of the desired current reference. At step 310, the actual output current is compared to the desired reference and a difference signal is generated.

At step 312, the rate of change in the difference signal is determined. This may be accomplished, for example, by determining the slope of the difference signal. If, at step 314, the rate of change is greater than a rate of change threshold, the pilot switch is closed (conducting) at step 316. If, however, the rate of change is not greater than the rate of change threshold, the process repeats and the pilot switch remains open (non-conducting). In other words, if the rate of change exceeds a threshold, the tip is re-connected into the circuit to cause the pilot arc to re-attach.

Figure 4:
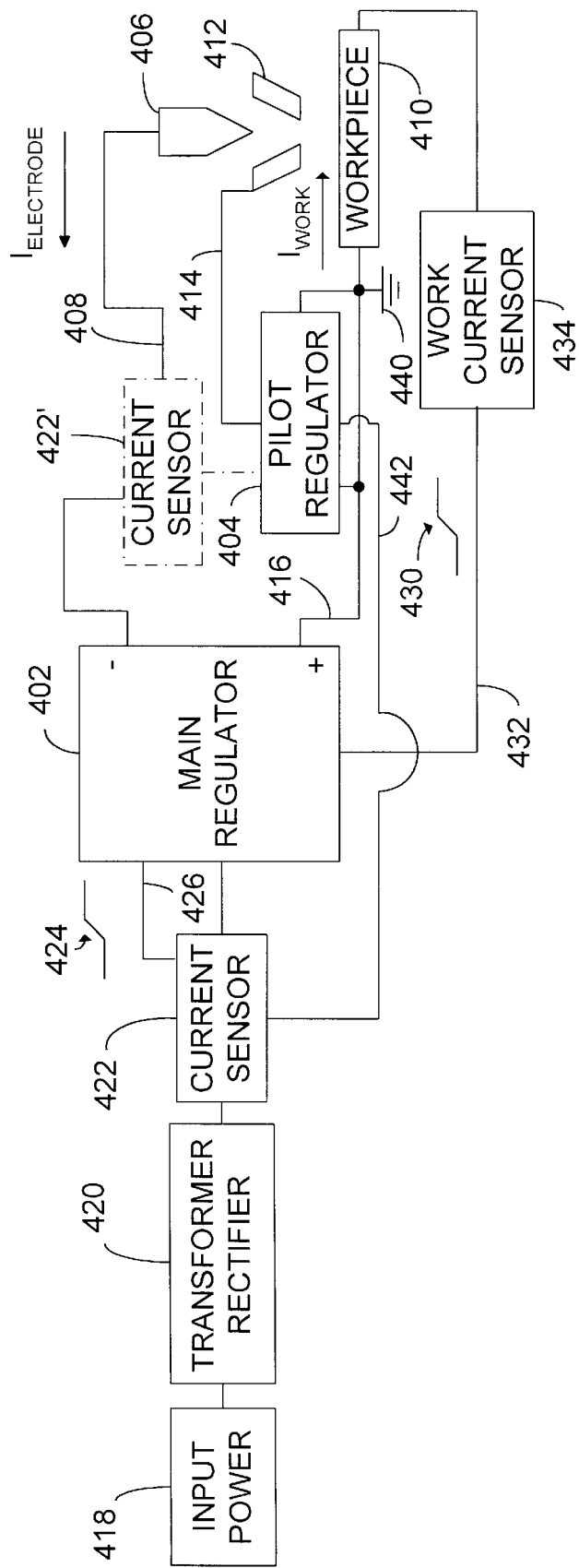
FIG. 4 is a block diagram of aspects of a plasma-arc torch system, including an alternative pilot re-attach circuit of the invention.

Referring now to FIG. 4, which illustrates, in block diagram form, a plasma-arc torch system 400 suitable for use in connection with a workpiece 410, and including an alternative pilot re-attach circuit. The torch system 400 includes two regulator circuits—a main regulator circuit 402 and a pilot regulator circuit 404—for regulating a current flowing in a circuit path associated with torch system 400. The pilot regulator circuit 404 of this embodiment preferably includes an IGBT. System 400 also includes an electrode 406 in electrical communication with a negative side of the main regulator 402 via a line 408 of the circuit path. A tip 412 is selectively coupled to the positive side of main regulator 402, and is thus coupled into the circuit path with the electrode 406, via the pilot regulator 404 and lines 414, 416.

The main regulator 402 preferably receives AC input power 418 via a transformer rectifier circuit 420 which is generally known in the art. Main regulator 402 preferably comprises a current regulator, and thus, a current sensor 422 senses the current draw and provides an output current signal 424 on line 426 to main regulator 402. Current regulation is discussed generally above with respect to FIGS. 1 and 2. It is to be understood that although the current sensor 422 is illustrated as being on the input side of main regulator 402, other current sensor configurations are possible. For example, another arrangement is illustrated in phantom. Thus, any current sensor that provides a signal having a parameter indicative of the system output current, so that main regulator 402 can regulate such output current, will suffice.

Preferably, main regulator 402 also receives a work current signal 430, via a line 432 and a work current sensor 434. The work current signal 430 preferably comprises a signal having a parameter indicative of the current flowing through workpiece 410. Like the current sensors illustrated in FIG. 1, both current sensor 422 and work current sensor 434 may be constructed in various ways, including, for example, low-resistance, high-power current sensing resistors, current sensing toroids, or other circuitry that provides a reliable indication of the presence of a current and/or the magnitude of such current.

As illustrated in FIG. 4, pilot regulator 404 is connected in circuit relationship with main regulator 402, a positive ground 440, workpiece 410, and tip 412. Pilot regulator 404 monitors the total output current 424 via line 442.

In operation, when a torch operator engages the torch switch (not shown) and all of the safety interlocks are satisfied, pilot regulator 404 creates a conduction path between tip 412 and the positive return. Thus, when gas is flowing and current is supplied, a pilot arc forms in the gap between electrode 406 and tip 412. So long as main regulator 402 senses no appreciable work current via work current sensor 434, it attempts to maintain the output current (e.g., $I_{electrode}$) at a pilot level (e.g., 15 A). This is the pilot operating mode. As electrode 406 is moved closer to workpiece 410, some of the current flows through workpiece 410 and the arc transfers such that the arc is now formed between electrode 406 and workpiece 410. Main regulator 401 senses the presence of substantial work current via work current sensor 434 and now attempts to maintain the output current at a relatively higher cutting level (e.g., 25 A or more) in this transferred arc mode.

Pilot regulator 404, which as indicated above preferably comprises an IGBT, controls whether tip 412 is connected into the conduction path. As has already been explained herein, when a torch system operates in the pilot mode, tip 412 is connected to the positive ground (sometimes referred to as the positive return) so that current flows between tip 412 and electrode 406 to maintain a pilot arc. In the transferred arc mode, however, tip 412 is preferably open circuited so that no current flows between tip 412 and electrode 406. Pilot regulator 404 advantageously achieves such action by monitoring the total output current (e.g., $I_{electrode}$ as reflected in output current signal 424) and attempting to control/regulate the portion of the total output that flows through tip 412 via lines 414, 416. In particular, pilot regulator 404 is preferably constructed and arranged to limit the current flowing through the tip to an intermediate current level (e.g., 18 A) between the pilot current level (e.g., 15 A) and the cutting current level (e.g., 25 A or more).

Thus, as can now be appreciated, although pilot regulator 404 monitors and is responsive to the total output current, it is capable of only regulating a portion of that current—the portion flowing through tip 412 because it is connected in series with tip 412. Accordingly, when torch system 400 operates in the pilot mode, main regulator 402 limits the output current (e.g., $I_{electrode}$) to the pilot level (e.g., 15 A), but pilot regulator 404 senses this pilot level (via output current signal 424) and attempts to increase the current flow by controlling the current flow through tip 412 to the relatively larger intermediate current level (e.g., 18 A). Thus, pilot regulator 404 turns the IGBT full on. Such action has the effect of creating a very low impedance path between tip 412 and the positive return, thereby allowing a pilot arc to be maintained between tip 406 and tip 412.

In the transferred arc mode, on the other hand, main regulator 402 allows the total output current to increase to the cutting level (e.g., 25 A or more). Hence, in the transferred arc mode, the $I_{electrode}$ is appreciably greater than the intermediate level (18 A). Pilot regulator 404 senses this current level (via output current signal 424) and attempts to decrease the current flow by controlling the current flow through the tip. Thus, pilot regulator 404 turns the IGBT full off. If, however, the transferred arc weakens (e.g., because it is stretched such that there is no longer sufficient voltage to maintain the output current at the desired level), the sensed output current eventually drops to a level less than or equal to the intermediate level (18 A), but greater than the pilot level (15 A). In such a situation, pilot regulator 404 senses the current level and gates the IGBT such that a current path is established between electrode 406 and tip 412 before the transferred arc fully extinguishes. Hence, pilot regulator 404 permits the arc to rapidly re-attach between electrode 406 and tip 412 without the need to recycle the torch starting procedures.

Figure 5:
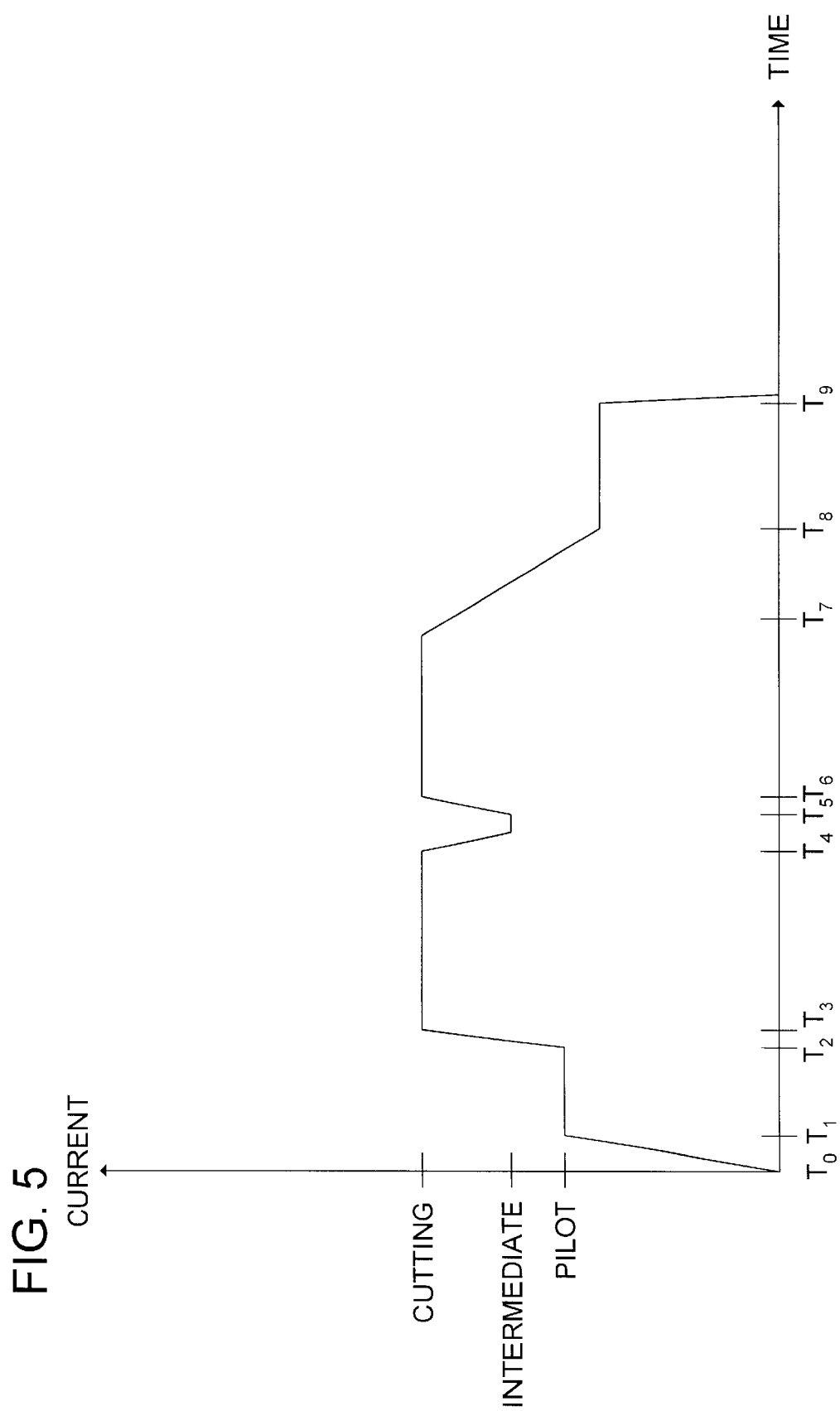
FIG. 5 is an exemplary timing diagram illustrating aspects of the pilot re-attach circuit of FIG. 4.

FIG. 5 is an exemplary timing diagram that illustrates various aspects of the pilot re-attach circuitry of FIG. 4. At time T0, the operator depresses the torch switch and a pilot arc starting process is initiated (e.g., contact starting or high frequency, high voltage starting). At time T1, a pilot arc is established between electrode 406 and tip 412. At time T2, electrode 406 has been moved sufficiently close to workpiece 410 to allow the arc to transfer. The pilot arc is extinguished and the cutting arc is fully established by time T3. At time T4, the torch is momentarily pulled away from workpiece 410 and the output current drops off as the arc voltage can no longer be maintained by main regulator 402. About time T5, a pilot arc is re-established between tip 412 and electrode 406 by operation of pilot regulator 404, as described above. After time T5, electrode 406 is again moved near workpiece 410, the arc transfers, and the output current ramps back up to the cutting level (e.g., 25 A or more), and the pilot arc is extinguished at T6 by operation of pilot regulator 404. At time T7, the torch is again pulled away from workpiece 410 and the output current drops accordingly. Pilot regulator 404 re-establishes the pilot arc between times T7 and T8. By time T8, the transferred arc is fully extinguished. At time T9, the torch switch is released, terminating torch operations.

Figure 6:
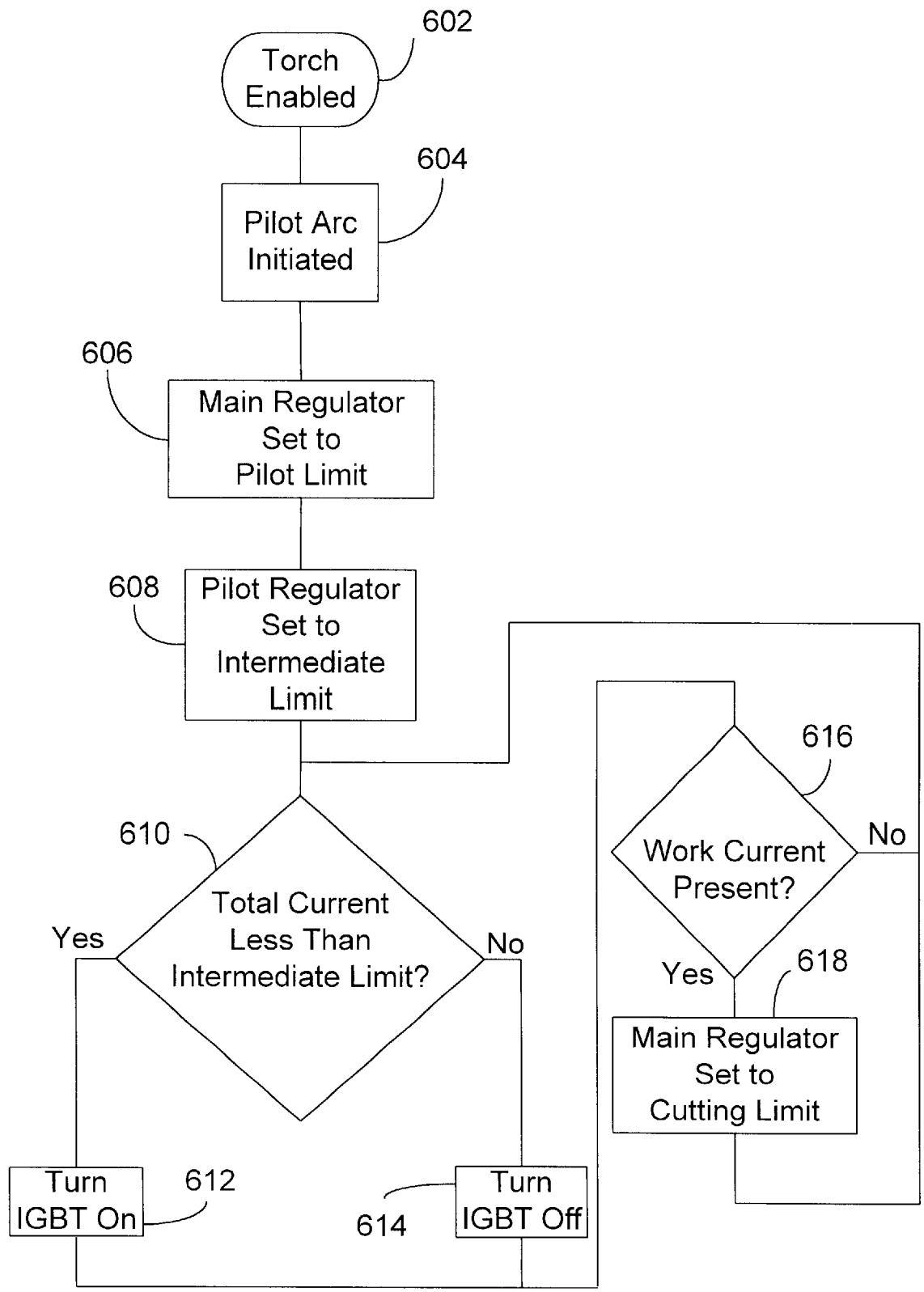
FIG. 6 is a flow diagram illustrating an alternative method of the invention for operating a plasma-arc torch to cause a pilot arc to re-attach before a transferred arc extinguishes.

FIG. 6 is a flow diagram illustrating a method of operating a plasma-arc torch system, such as the system of FIG. 4, to provide pilot arc transfer control. At step 602, all safety interlocks have been satisfied and the torch system has become operational. A pilot arc is struck at step 604. If no work current is sensed via work current sensor 434, main regulator 402 regulates the current output at the pilot level (e.g., 15 A) at step 606. Step 608 reflects the fact that the pilot re-attach circuit of FIG. 4 includes a pilot regulator 404 that is constructed and arranged to attempt to regulate current to an intermediate level (e.g., 18 A) between the pilot level (e.g., 15 A) and the cutting level (e.g., 25 A or more).

Steps 610, 612, and 614 illustrate, in flow diagram form, how the IGBT of pilot regulator 404 is used to attempt to control current, but has the effect of connecting tip 412 into the circuit in the pilot mode, and disconnecting tip 412 from the circuit in the transferred arc mode. At step 610, the total output current is compared to the intermediate current limit. If the total current is less than the intermediate limit, the IGBT is turned full on (step 612) in an attempt to increase the total current. If, however, the total current is greater than the intermediate limit, the IGBT is turned full off (step 614), in an attempt to decrease the total current. Steps 616 and 618 illustrate that the presence of work current preferably causes main regulator 402 to maintain the total current output at the cutting level (e.g., 25 A or more).

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A plasma-arc torch system for use in connection with a workpiece, the torch system comprising:
   a power source providing an output current;
   an electrode positioned in a circuit path with the power source, said electrode having the output current flowing therethrough;
   a tip adjacent the electrode;
   a current reference circuit providing a current reference signal having a parameter indicative of a desired output current
   a current regulator circuit providing an error signal having a parameter indicative of a difference between the output current and the desired output current;
   a rate of change sensor receiving the error signal, said rate of change sensor detecting a rate of change in the error signal and selectively providing a switch control signal having a parameter indicative of the rate of change in the error signal; and
   a switch circuit responsive to the switch control signal for selectively electrically connecting the tip into the circuit path.

2. The plasma-arc torch system of claim 1 wherein the current regulator comprises an error amplifier comparing the output current to the desired output current such that the error signal is a function of a difference between the output current and the desired output current.

3. The plasma-arc torch system of claim 2 wherein the error signal comprises a voltage error signal and wherein the rate of change sensor comprises a dv/dt sensor sensing a change in the voltage error signal with respect to time.

4. The plasma-arc torch system of claim 3 wherein the dv/dt sensor comprises:
   a comparator having an inverting input and a non-inverting input;
   a first R-C circuit receiving the voltage error signal and electrically coupled to the non-inverting input of the comparator, said first R-C circuit having a first R-C time constant; and
   a second R-C circuit receiving the voltage error signal and electrically coupled to the inverting input of the comparator, said second R-C circuit having a second R-C time constant such that the first R-C time constant is shorter than the second R-C time constant.

5. The plasma-arc torch system of claim 1 wherein the switch circuit includes an IGBT.

6. The plasma-arc torch system of claim 1 wherein the rate of change sensor comprises:
   a comparator having an inverting input and a non-inverting input;
   a first R-C circuit receiving the error signal and electrically coupled to the non-inverting input of the comparator, said first R-C circuit having a first R-C time constant; and
   a second R-C circuit receiving the error signal and electrically coupled to the inverting input of the comparator, said second R-C circuit having a second R-C time constant such that the first R-C time constant is shorter than the second R-C time constant.

7. A plasma-arc torch system for use in connection with a workpiece, the torch system comprising:
   a power source providing an output current;
   an electrode positioned in a circuit path with the power source, said electrode having the output current flowing therethrough;
   a tip adjacent the electrode;
   a current reference circuit providing a current reference signal having a parameter indicative of a desired value of the output current;
   a current sensing circuit providing a sensed current signal having a parameter indicative of the output current;
   an error amplifier comparing the current reference signal to the sensed current signal and generating an error signal having a parameter indicative of a difference between the current reference signal and the sensed current signal;
   a rate of change sensor electrically connected to the error amplifier, said rate of change sensor receiving the error signal and selectively providing a switch control signal in response to a rate of change in the error signal; and
   a switch circuit responsive to the switch control signal for selectively electrically connecting the tip into the circuit path with the power source and the electrode.

8. The plasma-arc torch system of claim 7 wherein the rate of change sensor comprises a dv/dt sensor sensing a change in the error signal with respect to time.

9. The plasma-arc torch system of claim 8 wherein the dv/dt sensor comprises:
   a comparator having an inverting input and a non-inverting input;
   a first R-C circuit receiving the error signal and electrically coupled to the non-inverting input of the comparator, said first R-C circuit having a first R-C time constant; and
   a second R-C circuit receiving the error signal and electrically coupled to the inverting input of the comparator, said second R-C circuit having a second R-C time constant such that the first R-C time constant is shorter than the second R-C time constant.

10. The plasma-arc torch system of claim 7 wherein the switch circuit includes an IGBT.

11. A pilot re-attach circuit for use in a plasma-arc torch system including a power source providing an output current, an electrode positioned in a circuit path with the power source and having the output current flowing therethrough, a tip adjacent the electrode, and an error amplifier generating an error signal in response to a difference between a signal representative of a sensed operating current and a signal representative of a desired operating current, said pilot re-attach circuit comprising:
   a rate of change sensor receiving the error signal and responsive to a time rate of change of the error signal, said rate of change sensor providing a switch control signal having a first state when the time rate of change of the error signal is less than a threshold and having a second state when the time rate of change of the error signal exceeds the threshold; and
   a pilot switch responsive to the switch control signal, said pilot switch being operable to electrically connect the tip into the circuit path with the power source and the electrode when the switch control signal is in the second state.

12. The pilot re-attach circuit of claim 11 wherein the rate of change sensor comprises a dv/dt sensor sensing a change in the time rate of change of the error signal.

13. The pilot re-attach circuit of claim 12 wherein the dv/dt sensor comprises:
   a comparator having an inverting input and a non-inverting input;
   a first R-C circuit receiving the error signal and electrically coupled to the non-inverting input of the comparator, said first R-C circuit having a first R-C time constant; and a second R-C circuit receiving the error signal and electrically coupled to the inverting input of the comparator, said second R-C circuit having a second R-C time constant such that the first R-C time constant is shorter than the second R-C time constant.

14. The pilot re-attach circuit of claim 11 wherein the pilot switch comprises an IGBT.

15. A plasma-arc torch system for use in connection with a workpiece, the torch system comprising:

power source means for providing an output current;

an electrode positioned in a circuit path with the power source means, said electrode receiving the output current;

a tip adjacent the electrode;

current reference means for providing a current reference signal having a parameter indicative of a desired value of the output current;

current sensing means for providing an actual output current signal having a parameter indicative of the output current;

comparing means for comparing the current reference signal to the actual output current signal and for generating an error signal having a parameter indicative of the difference between the current reference signal and the actual output current signal;

detector means electrically connected to the error amplifier, said detector means for receiving the error signal and selectively providing a switch control signal in response to a rate of change in the error signal; and switching means responsive to the switch control signal for selectively electrically connecting the tip into the circuit path with the power source means and the electrode.

16. A method of operating a plasma-arc torch system including a power supply supplying an output current and a pilot switch for establishing a pilot arc mode of operation, said method comprising:

comparing an output current signal having a parameter representative of the output current to a reference signal having a parameter representative of a desired output current;

generating an error signal having a parameter representative of a difference between the output current and the desired output current;

monitoring a rate of change of the error signal; and operating the pilot switch when the rate of change of the error signal exceeds a rate of change threshold such that the pilot arc mode of operation is established.

17. A method of re-establishing a pilot arc in a plasma-arc torch system before a transferred arc is extinguished, the plasma-arc torch system including an electrical power source providing an output current, an electrode receiving the output current, a tip adjacent the electrode, and a pilot switch selectively connecting the tip in a circuit path with the electrode and the power source such that when the pilot switch is closed, a pilot arc is selectively established between the electrode and the tip, the method comprising:

monitoring an output current signal having a parameter representative of the output current provided by the electrical power source;

generating a current reference signal having a parameter representative of a desired output current;

comparing the output current signal to the current reference signal and generating an error signal representative of a difference between the output current and the desired output current;

detecting a rate of change in the error signal;

generating a switch control signal in response to the detected rate of change in the error signal, said switch control signal being representative of whether the detected rate of change in the error signal is greater than or less than a rate of change threshold; and operating the pilot switch in response to the rate of change signal such that when the rate of change is greater than the rate of change threshold the pilot switch closes and connects the tip into the circuit path with the electrode and the power source.

18. A plasma-arc torch system for use in connection with a workpiece, said torch system comprising:

a power source having a main regulator selectively providing an output current;

an electrode positioned in a circuit path with the power source and receiving the output current;

a tip selectively connected into the circuit path with the power source and the electrode;

an output current sensor providing an output current signal having a parameter indicative of the output current;

a work current sensor providing a work current signal having a parameter indicative of the presence of work current flowing through the workpiece, the main regulator being responsive to the work current signal and the output current signal for regulating the output current to a first level when the work current signal indicates the presence of work current and regulating the output current to a second level when the work current signal indicates the presence of no work current; and a pilot regulator responsive to the output current signal, said pilot regulator connecting the tip into the circuit path with the power source and the electrode when the output current is less than a pilot regulator threshold and disconnecting the tip from the circuit path with the power source and the electrode when the output current is greater than the pilot regulator threshold.

19. A method of operating a plasma-arc torch system including a power supply providing an output current, an electrode receiving the output current, a tip adjacent the electrode, and a switch selectively connecting the tip into a circuit path with the power supply and the electrode, said torch system having a pilot mode of operation in which the power supply regulates the output current to a pilot current level, and a transferred arc mode of operation in which the power supply regulates the output current to a cutting current level such that the cutting current level is greater than the pilot current level, said method comprising:

sensing the output current;

comparing the sensed output current to an intermediate current level between the pilot current level and the cutting current level;

configuring the switch as a pilot regulator for regulating a portion of the output current flowing through the tip to an intermediate level between the pilot current level and the cutting current level, said pilot regulator receiving an output current signal indicative of the output current;

connecting the tip into the circuit path with the power supply and the electrode when the output current signal indicates that the output current is less than the intermediate current threshold; and disconnecting the tip from the circuit path with the power supply and the electrode when the output current signal indicates that the output current is greater than the pilot regulator threshold.

* * * * *